Sept. 15, 1959  J. W. HARRISON ET AL  2,903,744
APPARATUS FOR MAKING CORRUGATED FLEXIBLE RUBBER TUBES
Filed Sept. 17, 1954  2 Sheets-Sheet 1
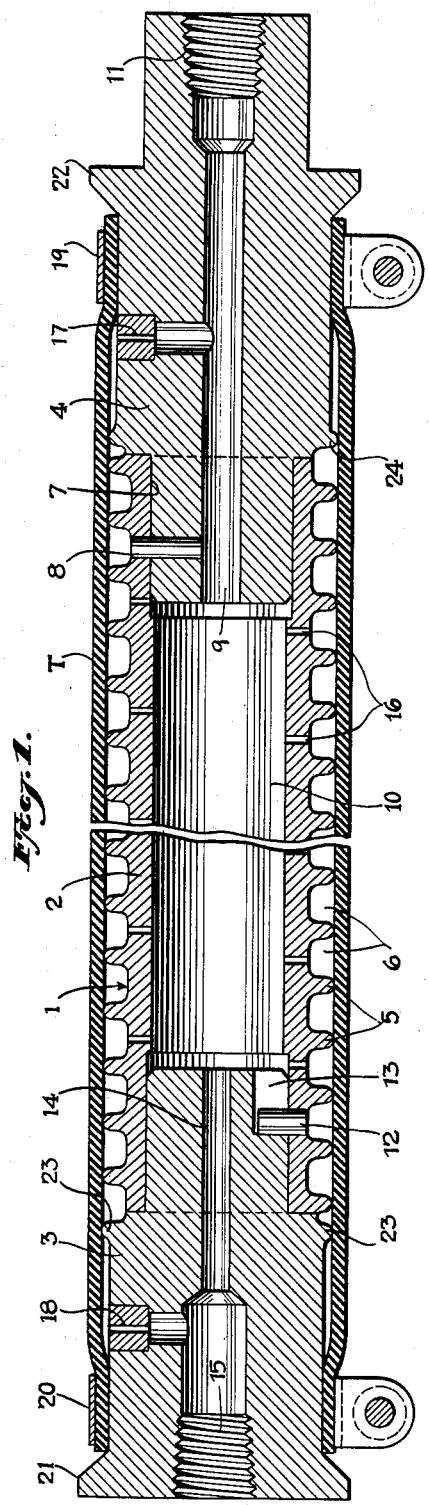
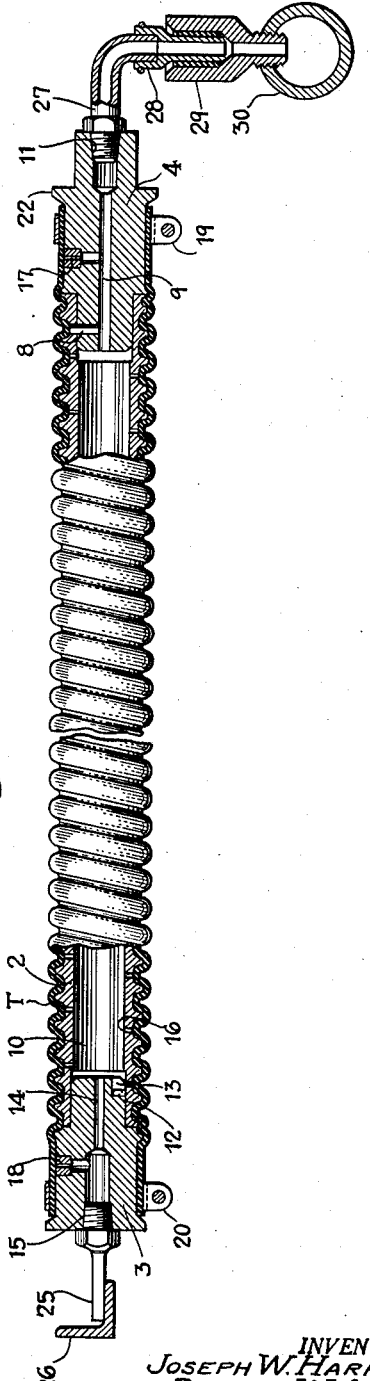
INVENTORS.
JOSEPH W. HARRISON.
RICHARD W. ASAY.
BY
ATTORNEYS.

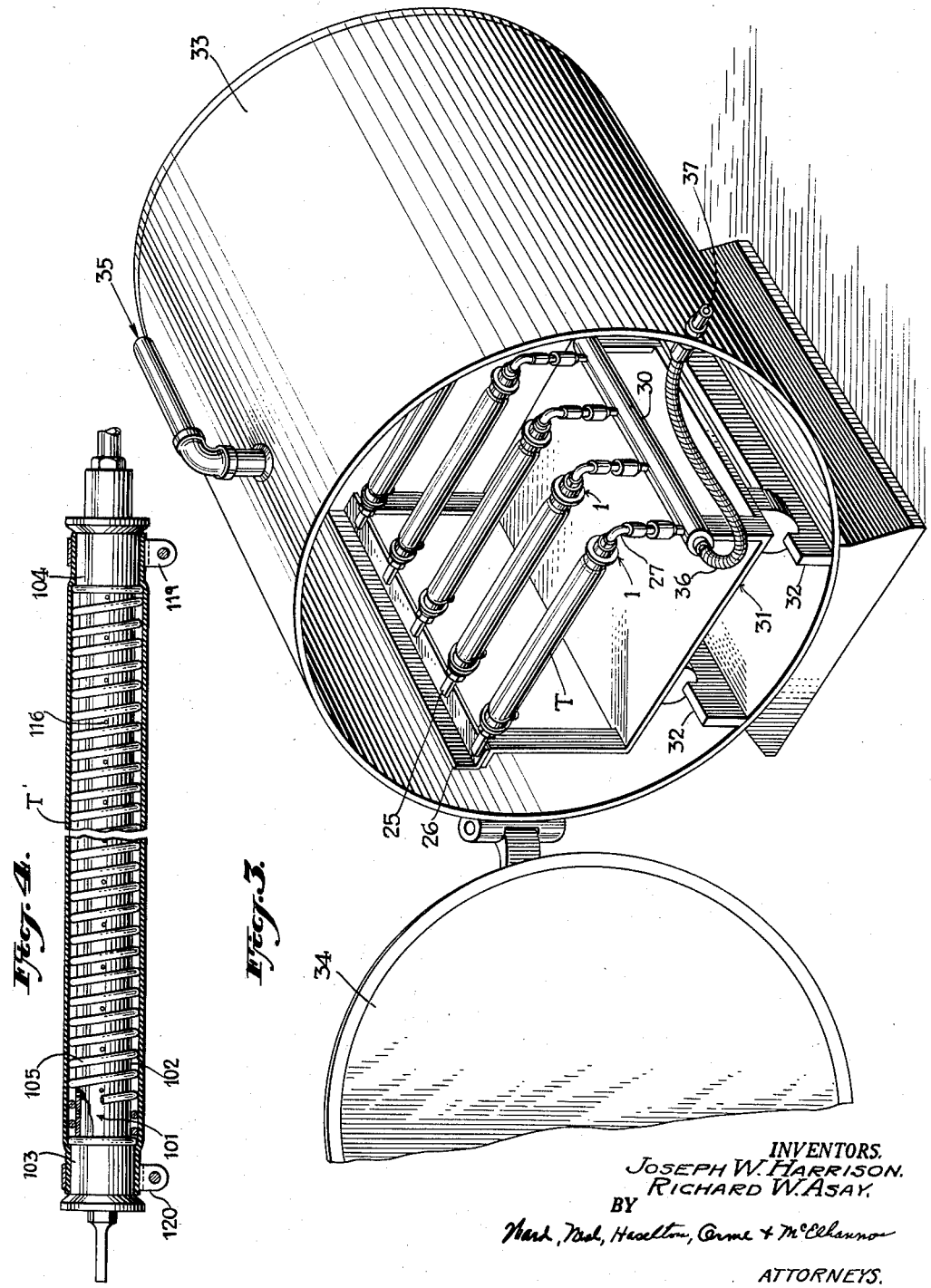

United States Patent Office 2,903,744
Patented Sept. 15, 1959

2,903,744

APPARATUS FOR MAKING CORRUGATED FLEXIBLE RUBBER TUBES

Joseph W. Harrison and Richard W. Asay, Trenton, N.J., assignors to Thermoid Company, Trenton, N.J., a corporation of Delaware Application September 17, 1954, Serial No. 456,798

1 Claim. (Cl. 18—19)

This invention relates to apparatus for making hollow articles of predetermined sidewall configuration from synthetic or natural rubber or other thermoplastic material. The invention is especially useful in making corrugated flexible tubes of rubber or rubber-like material; but certain features of the invention are useful in making other articles.

The embodiment as employed in the production of corrugated flexible rubber tubes for use as hose will serve to illustrate the various features of the invention.

Heretofore, corrugated rubber tubes have been made in numerous ways, but each process has certain objectionable features from the standpoint of either time or expense or both.

An object of the invention is to provide an improved apparatus for making hollow articles having a predetermined sidewall configuration from thermo-plastic material.

Another object of the invention is to simultaneously form corrugations in and vulcanize a rubber tube while positioned on a forming mandrel.

A further object is to concurrently form and vulcanize a plurality of corrugated rubber tubes simultaneously with vulcanization.

The invention consists in the novel features, arrangements, combinations and construction of parts of the apparatus and means also hereinafter described in accordance with certain preferred embodiments thereof. The invention will be more particularly pointed out in the appended claim.

Further objects of the invention will more fully appear from the following description taken in connection with the accompanying drawings illustrating the preferred embodiment of the apparatus.

Referring to the drawings illustrating, by way of example, such apparatus,

Fig. 1 is a longitudinal sectional view of a molding form, in the shape of a mandrel, showing a tube of rubber in position thereon to be formed and cured;

Fig. 2 is a similar view of the mandrel shown in Fig. 1, with certain other parts connected thereto and showing the rubber tube after it has been formed and cured on the mandrel;

Fig. 3 is a prospective view of a vulcanizing or curing chamber showing its loading door open and a cart disposed therein on which a plurality of mandrels such as shown in Fig. 2 are mounted; and Fig. 4 is a view similar to Fig. 1 but showing a modified mandrel.

Apparatus

Referring in particular to Fig. 1: The mandrel is designated in general as 1 and present embodiment comprises a tubular body portion 2 and end members 3 and 4. The tubular body 2 is provided on its outer surface with a series of peripherially extending longitudinally spaced ridges such as 5 and alternately intervening valleys such as 6 which thereby provide an exterior surface for forming the corrugated configuration in the wall of the tube. In the present embodiment the ridges 5 are formed as a continuing helix; but it is to be understood that the ridges could be separately formed independently each of the other. The end member 4 is provided with an inner end of reduced diameter which is disposed within a bore 7, formed in the end of the tube 2 and the end is fixed to the tube by a suitable means such as a pin 8. The end member 4 is provided with an axially extending bore 9 whose inner end is in communication with the mandrel cavity 10 and whose outer end is provided with an enlarged portion having interior threads 11. The end member 3 is similarly provided with an end disposed in a bore at the opposite end of the tubular body 2, but in this instance the end 3 is secured to the tubular body 2 in such manner as to provide for quick detachability such means as shown as a bayonet connection comprising a pin 12 fixed to the tubular member 2 at its outer end and having its inner end extending inwardly within a bayonet slot 13 formed in the end member 3. The end member 3 likewise is provided with an axially extending passageway 14 in communication at its inner end with the cavity 10 and provided at its outer end with the threaded portion 15.

The mandrel is provided with a plurality of vent ports such as 16, placing the cavity 10 in communication with the exterior surface of the mandrel at points in the valleys 6 between the ridges 5 on the exterior surface. Similarly, vent ports 17 and 18 are provided in the end members 3 and 4 respectively, serving to communicate the exterior of the mandrel at these points in communication with the passageways 9 and 14 which in effect form extensions of the cavity 10.

Clamp rings 19 and 20 are provided for clamping a hollow tubular blank T adjacent respectively opposite ends to the mandrel at points outwardly beyond the vent ports 17 and 18. The end members 3 and 4 are preferably provided with peripheral flanges such as 21 and 22 and with beads 23 and 24 for the purpose to be later described.

Referring more particularly to Figs. 2 and 3: The mandrel 1 has rigidly secured to the end member 3 a supporting arm 25 in threaded engagement within the threaded portion 15 and whose outer portion is flattened for supporting engagement with a longitudinal member such as a channel 26. A connecting pipe 27 has its inner end in threaded engagement within the threaded portion 11 of the end 4 and its outer end is provided with a quick detachable connector member 28 adapted for engagement with a cooperating quick detachment part 29 which is fixed to a manifold 30. The manifold 30 and longitudinal member 26 are formed as integral parts of a cart 31 (Fig. 3) which is slantingly mounted on tracks 32 fixed adjacent the lower wall of vulcanizing chamber 33, so that the cart 31 may be readily withdrawn from the vulcanizing chamber for purposes of loading. As will be seen from Fig. 3 the cart 31 is adapted to hold a plurality of mandrels 1. The vulcanizing chamber 33 is provided with a door 34 having a suitable sealing means to permit the desired pressure to be created in the chamber 33 such as by the admission of steam under pressure through the pipe 35. Flexible pipe 36 is connected at one end to the manifold 30 and the other end extends through a suitable seal provided in the wall of the chamber 33 at the outer end 37 of the flexible pipe, being in connection with the atmosphere.

Operation

With the end 3 of the mandrel 1 (Fig. 1) removed, a hollow blank or tube of uncured, i.e., incompletely cured, rubber T (Fig. 1) is placed over the mandrel body 2 until its forward end abuts the downwardly inclined edge of the flange 22 and is clamped in position by means of the clamp ring 19. The end member 3 is inserted in the opposite end of the tube T and fastened to the mandrel body 2 by the bayonet connection 12—13, and the rear end of the tube is clamped tightly in position abutting the inclined edge of the flange 21 by means of the clamp 20. It is noted at this point that the diameter of the tube is preferably such that it snugly engages the outer diameter of the ridges 5. Similar tubular blanks are likewise placed in position on their respective mandrels, and a plurality of mandrels bearing the uncured tubes are placed in position on the cart 31 with the interior of each mandrel placed in communication with the common manifold 30 by means of its vent pipe 27 to thereby vent the interior of the mandrels to atmosphere through the flexible pipe 36. At this time the tubes T envelop the exterior surfaces of the mandrels bearing the aforesaid configurations and the vent holes are included in the sealed off portions of the tubes so that the valleys or indentations between the ridges are vented to atmosphere. Therefore, the interior surface of the tubes T are likewise subjected to atmospheric pressure while the exterior surfaces are subjected to super-atmospheric pressure.

With the mandrels bearing the tubes disposed as above described and with the door 34 sealed in closed position, steam under super-atmospheric pressure is introduced through the pipe 35. Preferably saturated steam at fifty pounds gauge pressure and about 298° F. is employed for simultaneously causing the tubes to closely conform to the configuration of the mandrels and vulcanizing or curing the tubes. The period of time for completing vulcanization will vary with the character and amount of the vulcanizing agent. The steam pressure may be varied from a minimum of about twenty pounds gauge pressure at about 258° F. to a maximum of about seventy pounds gauge pressure at about 316° F. These pressures and temperatures are suitable for natural rubber (Hevea) as well as for neoprene (polychloroprene).

The heat supplied in chamber 33 softens the thermoplastic material of the tube T to a state where it can be readily formed or molded and the differential between the pressure in chamber 33 to which the exterior of the tube is subjected and the atmospheric pressure to which the sealed off interior of the tube is subjected forces the softened material to conform closely to the exterior surface of the mandrel. In this connection it is noted that between the beads 23 and 24 and the flanges 21 and 22, the end members 3 and 4 are provided with smooth cylindrical portions to form smooth cylindrical ends of definite lengths on the tube; the vent holes 17 and 18 insuring such formation (Fig. 2).

After the tubes have been completely formed and vulcanized to the extent desired, the steam pressure is released, the chamber is opened, the cart withdrawn, and the mandrels with the tubes formed and cured thereon are readily removed by the quick detachable connectors 28 and 29. At this time the tubes have been corrugated and assume the position indicated in Fig. 2.

The corrugated tubes may be removed readily by reversing the procedure above described with respect to placing them on the mandrels. This removal is facilitated by inserting air under pressure through the pipes 27 and during this operation the flanges 21 and 22 serve to somewhat limit the leakage of the air while the tubes are expanding to free the interior of the tubes for axial withdrawal over the ridges such as 5.

*Modified mandrel*

The invention is also adapted to make corrugated flexible hose of the type where the corrugations follow a helical pattern and the tube is reinforced by a helical coil or spring. The helical spring forms a part of the forming mandrel and when the tube is formed the helical spring becomes a part of and is removed from the tubular body portion of the mandrel. A modified mandrel for such use is shown in Fig. 4. In general the mandrel, designated as 101, is similar to the mandrel 1 previously described with reference to Figs. 1 and 2 and only such features of the mandrel 101 will be described as differ from the mandrel 1.

In this embodiment a tubular body 102 takes the form of a cylindrical tube having a smooth exterior surface. A helical wire spring 105, such as steel, surrounds the tube 102 and is held thereon by friction only so as to be slidably removable therefrom. The helical wire spring 105 provides ridges which function in place of the ridges 5 of Fig. 1. The tube 102 is provided with vent ports 116 disposed between the helices for the purpose as described above with reference to the vent ports 6 of Fig. 1. The tube 102 carries secured at its ends, end members 103 and 104 constructed and arranged as described with reference to the members 3 and 4 of Fig. 1 and strap clamps 119 and 120 serve to hold an uncured rubber tube such as T' in position on the mandrel, which is supported and connected in the manner as above described with reference to Figs. 1–3.

When the tube T' has been molded and cured in the form similar to that shown in Fig. 2, the tube T' together with the spring 105 which is now disposed within the corrugated interior thereof, is removed from the tubular cylindrical member 102. In this embodiment since the corrugation forming ridged part of the mandrel, i.e., the spring 105, is removed with the tube T', it is not necessary to dilate the tube to facilitate removal.

Having thus described our invention with particularity with reference to the preferred method of carrying out the same and in connection with the preferred apparatus for carrying out the same, and having referred to some of the possible modifications thereof, it will be obvious to those skilled in the art, after understanding our invention, that other changes and modifications may be made without departing from the spirit and scope of our invention, and we aim in the appended claim to cover such changes and modifications as are within the scope of the invention.

We claim:

A mandrel for making corrugated flexible tubes by a differential of internal and external fluid pressure comprising a rigid tubular member having end pieces secured to the ends thereof, one of said end pieces being secured to the tubular member by a quick detaching connection to facilitate the removal of a formed tube, said tubular member having an interior cavity and having an exterior provided with a series of peripherally extending ridges spaced apart axially and intervening valleys between said spaced ridges, said tubular member also having a plurality of vent ports extending from said cavity outwardly into said valleys, the exterior of each of said end pieces having a smooth cylindrical portion coaxial with said tubular member and defined at its inner end by a peripheral, re-entrant bead disposed adjacent the end of said tubular member and having an external diameter greater than that of said cylindrical portion, said cylindrical portion terminating more remotely from said inner end in an outwardly sloping peripheral flange, said flange having the shape of a truncated cone co-axial with said cylindrical portion, the smallest diameter of said flange being substantially equal to the diameter of said cylindrical portion and being adjacent said cylindrical portion and the largest diameter of said flange being remote from said cylindrical portion and being greater than the largest diameter of said ridges, each of said end pieces having a central bore communicating with said interior cavity of said tubular member and radial openings extending from the exterior of said cylindrical portion inwardly into communication with said central bore and one of said end pieces having an outlet opening from its central bore adapted to communicate with a vent tube.

References Cited in the file of this patent

UNITED STATES PATENTS

| | | |
|---|---|---|
| 1,168,390 | Goldsmith | Jan. 18, 1916 |
| 1,361,001 | Blaisdell | Dec. 7, 1920 |
| 1,423,760 | Fairchild | July 25, 1922 |
| 1,773,138 | Gammeter | Aug. 19, 1930 |
| 1,797,193 | Kimmich | Mar. 17, 1931 |
| 2,099,843 | Connell | Nov. 23, 1937 |
| 2,272,704 | Harding | Feb. 10, 1942 |
| 2,446,281 | Harding | Aug. 3, 1948 |
| 2,616,129 | Burton | Nov. 4, 1952 |
| 2,647,280 | Leguillon | Aug. 4, 1953 |
| 2,782,803 | Rothermel et al. | Feb. 26, 1957 |

FOREIGN PATENTS

| | | |
|---|---|---|
| 651,097 | Great Britain | Mar. 14, 1951 |